United States Patent
Shimada et al.

[11] Patent Number: 5,847,786
[45] Date of Patent: Dec. 8, 1998

[54] METHOD OF ORIENTING LIQUID CRYSTAL OF LIQUID CRYSTAL DISPLAY MEDIUM AND APPARATUS FOR CARRYING OUT THE SAME

[75] Inventors: Naoki Shimada; Shin Miyanowaki, both of Tokyo-To, Japan

[73] Assignee: Dai Nippon Printing Co., Ltd., Japan

[21] Appl. No.: 704,712

[22] PCT Filed: Jan. 22, 1996

[86] PCT No.: PCT/JP96/00106

§ 371 Date: Nov. 14, 1996

§ 102(e) Date: Nov. 14, 1996

[87] PCT Pub. No.: WO96/22560

PCT Pub. Date: Jul. 25, 1996

[30] Foreign Application Priority Data

Jan. 20, 1995 [JP] Japan .................................. 7-024515

[51] Int. Cl.⁶ .......................... G02F 1/1333; G02F 1/137
[52] U.S. Cl. ................ 349/86; 349/33; 349/139; 349/1; 349/20
[58] Field of Search ................... 349/33, 30, 2, 349/20, 86, 21, 88, 3, 139, 161, 191, 1; 345/38, 50, 52, 87

[56] References Cited

U.S. PATENT DOCUMENTS

| | | | |
|---|---|---|---|
| 4,712,878 | 12/1987 | Taniguchi et al. | 349/138 |
| 5,151,803 | 9/1992 | Wakita et al. | 349/173 |
| 5,351,143 | 9/1994 | Sato et al. | 349/138 |
| 5,515,144 | 5/1996 | Miyasaka et al. | 355/271 |
| 5,583,670 | 12/1996 | Iijima et al. | 349/86 |

FOREIGN PATENT DOCUMENTS

| | | |
|---|---|---|
| 0 555 982 A1 | 8/1993 | European Pat. Off. |
| 0 752 323 A1 | 1/1997 | European Pat. Off. |
| 4-34517 | 2/1992 | Japan |
| 4-71899 | 3/1992 | Japan |
| 5-66375 | 3/1993 | Japan |
| 5-167780 | 7/1993 | Japan |
| 5-257133 | 10/1993 | Japan |
| 5-301489 | 11/1993 | Japan |

*Primary Examiner*—Hung X. Dang
*Assistant Examiner*—Tai V. Duong
*Attorney, Agent, or Firm*—Parkhurst & Wendel

[57] ABSTRACT

A liquid crystal orienting method orients a liquid crystal of a liquid crystal display medium (1) having a base (2), a conductive layer (3) formed on the base (2), and a polymer dispersed liquid crystal film (PDLC film) (4) formed of a material prepared by dispersing the liquid crystal in a polymer. A charger (71) is disposed opposite to the surface of the liquid crystal display medium (1) on the side of the PDLC film (4) so as not to come into contact with the liquid crystal display medium (1), and a grounded electrode (72) is disposed near the charger (71) so as to come into contact with the liquid crystal display medium (1). A potential difference is created through the conductive layer (3) between a portion of the liquid crystal display medium (1) charged by the charger (71) and a portion of the same in contact with the electrode (72) by electrostatic induction. Consequently, a vertical electric field is applied to the PDLC film (4) to orient the liquid crystal of the PDLC film (4). The surface of the liquid crystal display medium (1) is covered with a nonconductive layer (5).

23 Claims, 4 Drawing Sheets

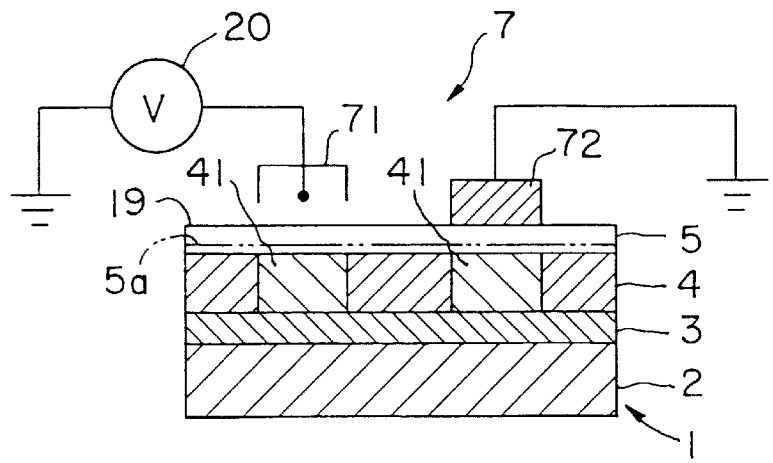
F I G. 1
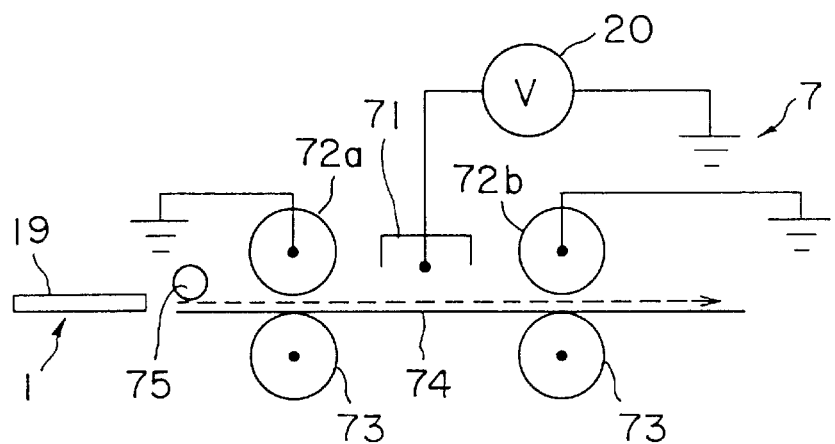
F I G. 2
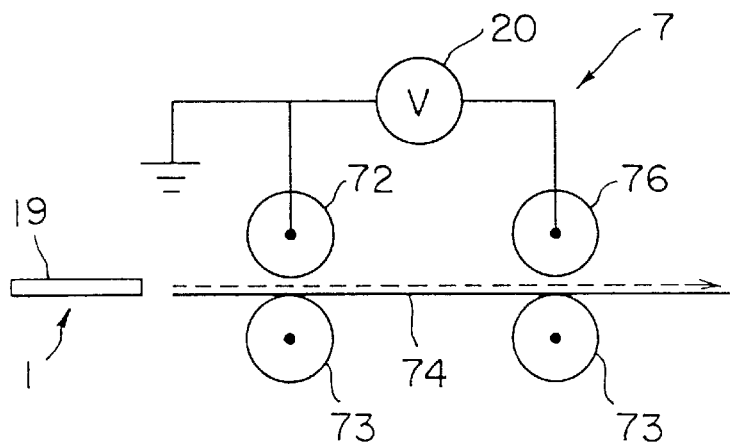
F I G. 3

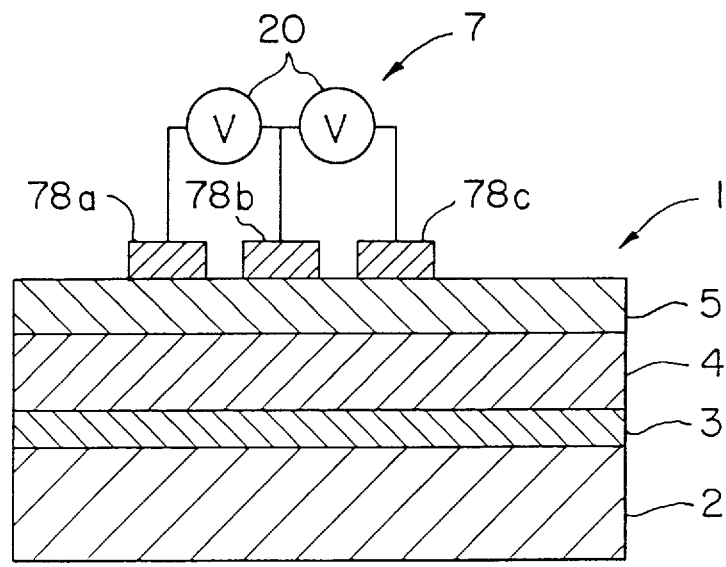
F I G. 8
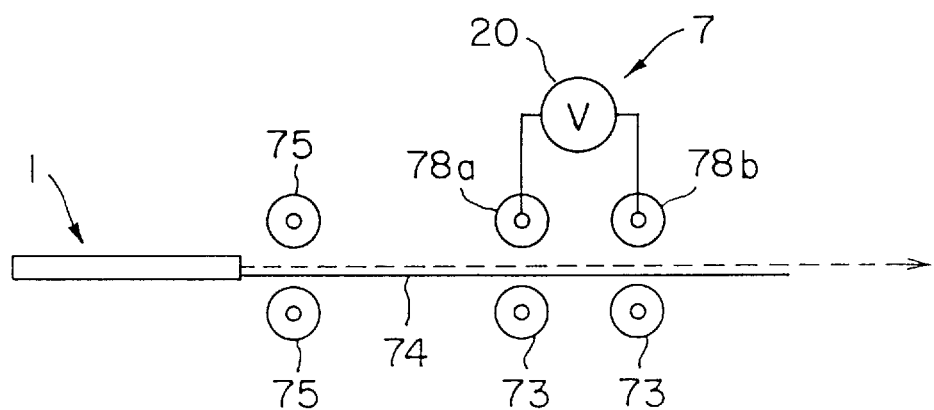
F I G. 9

METHOD OF ORIENTING LIQUID CRYSTAL OF LIQUID CRYSTAL DISPLAY MEDIUM AND APPARATUS FOR CARRYING OUT THE SAME

TECHNICAL FIELD

The present invention relates to a liquid crystal orienting method for changing the display mode of a reversible polymer dispersed liquid crystal film employed in a liquid crystal display medium, and a liquid crystal orienting apparatus.

BACKGROUND ART

Reversible display elements to which visible information is rewritable have become widely noticed. Mode of display of those reversible display elements changes when energy is applied temporarily to those reversible display elements by an external energy source, and the displayed information is held after energy has been removed to maintain a recording state. Such a displayed information storing property of these reversible display elements is utilized.

For example, one of the previously proposed reversible display elements employs a polymer-fatty-acid film of a material prepared by dispersing a fatty acid in a polymer matrix to utilize the properties of the fatty acid that changes between a white, opaque phase and a transparent phase. Another previously proposed reversible display element utilizes the reversible opening and closing of lactone rings of a leuco dye by a developer/subtracter agent. A third previously proposed reversible display element employs a polymer liquid crystal. These liquid crystal display elements have problems in durability to rewriting, preservation and aptitude for allowing rapid erasing of displayed information. Various liquid crystal display mediums provided with a liquid crystal display element employing a polymer dispersed liquid crystal film (hereinafter referred to as "PDLC film") formed by dispersing a smectic liquid crystal or the like in a polymer matrix are proposed in, for instance, JP-A No. 4-71899, and JP-A Nos. 5-294092 and 5-301489 applied for patent by the applicant of the present patent application.

The principle of recording visible information on and erasing visible information from the PDLC film uses light scattering and light transmission (change in the light absorptive power when a dichroic dye is used in combination with the liquid crystal and guest-host effect is available) due to the orderly change of the orientation of the liquid crystal molecules (change between a homeotropic orientation state or a homogeneous orientation state, and a random orientation state) by heat and an electric field.

When an opaque state (light scattering state) is used as a recording state, and a transparent state (light transmitting state) is as an erasing state, information can be written to the PDLC film with a heating means, such as a thermal head capable of spot-heating, and information can be erased from the PDLC film by holding the PDLC film, for instance, between electrodes and applying an electric field of an intensity exceeding a threshold for orienting the liquid crystal.

Accordingly, the liquid crystal display element employing a PDLC film may be called electrical liquid crystal display.

A liquid crystal display medium provided with a PDLC film and a conductive layer is disclosed in JP-A No. 4-71899. A transparent state in which this PDLC film is set by orienting the liquid crystal thereof by applying an electric field thereto is used as an erasing state or a recording state. A method of orienting the liquid crystal of the liquid crystal display medium grounds a conductive layer in contact with the PDLC film, and disposes the PDLC film between the conductive layer and an electrode or a surface charger included in an apparatus. This method is obviously analogous with a method of orienting the liquid crystal of a liquid crystal display panel. In JP-A No. 4-71899, the conductive layer underlying the PDLC film has a portion extending beyond the PDLC film and exposed on the surface of the liquid crystal display medium to form a terminal. The liquid crystal display medium must accurately be positioned to bring a grounding electrode to the terminal. There is the possibility of unsatisfactory orientation of the liquid crystal (unsatisfactory erasing or writing) due to faulty contact, and the deterioration of liquid crystal orienting performance due to the destruction of the conductive layer.

DISCLOSURE OF THE INVENTION

It is an object of the present invention to provide a liquid crystal orienting method for changing the display mode of a PDLC film included in a liquid crystal display medium by applying an electric field to the PDLC film, capable of orienting the liquid crystal of the PDLC film without using any exposed conductive layer, and to provide a liquid crystal orienting apparatus.

According to a first aspect of the present invention, a method of orienting a liquid crystal in a liquid crystal display medium comprising a base, a conductive layer formed on the base, and a reversible polymer dispersed liquid crystal film containing a the liquid crystal dispersed in a polymer, and formed on the conductive layer comprises steps of disposing a pair of electrodes on the side of the polymer dispersed liquid crystal film of the liquid crystal display medium, and changing the display mode of the polymer dispersed liquid crystal film by producing a potential difference between the pair of electrodes to orient the liquid crystal of the polymer dispersed liquid crystal film.

According to a second aspect of the present invention, a method of orienting a liquid crystal in a liquid crystal display medium comprising a base, a conductive layer formed on the base, and a reversible polymer dispersed liquid crystal film containing the liquid crystal dispersed in a polymer, and formed on the conductive layer comprises steps of disposing a charger on the side of the polymer dispersed liquid crystal film of the liquid crystal display medium, and changing the display mode of the polymer dispersed liquid crystal film by moving the liquid crystal display medium relative to the charger, by changing the charge of the polymer dispersed liquid crystal film by the charger to orient the liquid crystal of the polymer dispersed liquid crystal film.

According to a third aspect of the present invention, an apparatus for orienting a liquid crystal in a liquid crystal display medium comprising a base, a conductive layer formed on the base, and a reversible polymer dispersed liquid crystal film containing the liquid crystal dispersed in a polymer, and formed on the conductive layer comprises a pair of electrodes disposed on the side of the polymer dispersed liquid crystal film of the liquid crystal display medium, and a power source for producing a potential difference between the pair of electrodes.

According to a fourth aspect of the present invention, an apparatus for orienting a liquid crystal in a liquid crystal display medium comprising a base, a conductive layer formed on the base, and a reversible polymer dispersed liquid crystal film containing the liquid crystal dispersed in a polymer, and formed on the conductive layer comprises a charger disposed on the side of the polymer dispersed liquid crystal film of the liquid crystal display medium, a power source connected to the charger, and a conveying means for moving the liquid crystal display medium relative to the charger.

According to the first and the third aspect of the present invention, the conductive layer underlying the polymer dispersed liquid crystal film serves as a transverse cross-path when a potential difference is produced between the pair of electrodes, and a path of the potential difference is formed by electrostatic induction through the conductive layer in a portion of the polymer dispersed liquid crystal film lying between the pair of electrodes. In this state, a perpendicular electric field is applied to the portion of the polymer dispersed liquid crystal film lying between the pair of electrodes, and the liquid crystal of the polymer dispersed liquid crystal film is oriented when the intensity of the electric field is higher than a threshold necessary for orienting the liquid crystal.

According to the second and the fourth aspect of the present invention, the conductive layer underlying the polymer dispersed liquid crystal film serves as a transverse cross-path when the charged of the polymer dispersed liquid crystal film is changed by the charger by moving the liquid crystal display medium relative to the charger, and a path of the potential difference is formed by electrostatic induction through the conductive layer in a portion of the polymer dispersed liquid crystal film lying between the pair of electrodes. In this state, a perpendicular electric field is applied to a charged portion of the polymer dispersed liquid crystal film lying, and the liquid crystal of the polymer dispersed liquid crystal film is oriented when the intensity of the electric field is higher than a threshold necessary for orienting the liquid crystal.

BRIEF DESCRIPTION OF THE DRAWINGS

FIG. 1 is a schematic typical view of assistance in explaining the basic idea of a method of and an apparatus for orienting a liquid crystal included in a liquid crystal display medium, in a first embodiment according to the present invention;

FIG. 2 is a schematic typical view of assistance in explaining the basic idea of a method of and an apparatus for orienting a liquid crystal included in a liquid crystal display medium, in another embodiment according to the present invention;

FIG. 3 is a schematic typical view of assistance in explaining another method of orienting a liquid crystal included in a liquid crystal display medium, employing only electrodes;

FIG. 8 is a schematic typical view of assistance in explaining a method of and an apparatus for orienting a liquid crystal included in a liquid crystal display medium, in a further embodiment according to the present invention; and FIG. 9 is a schematic typical view of assistance in explaining a method of and an apparatus for orienting a liquid crystal included in a liquid crystal display medium, in a still further embodiment according to the present invention.

BEST MODE FOR CARRYING OUT THE INVENTION

First Embodiment

Figure 4:
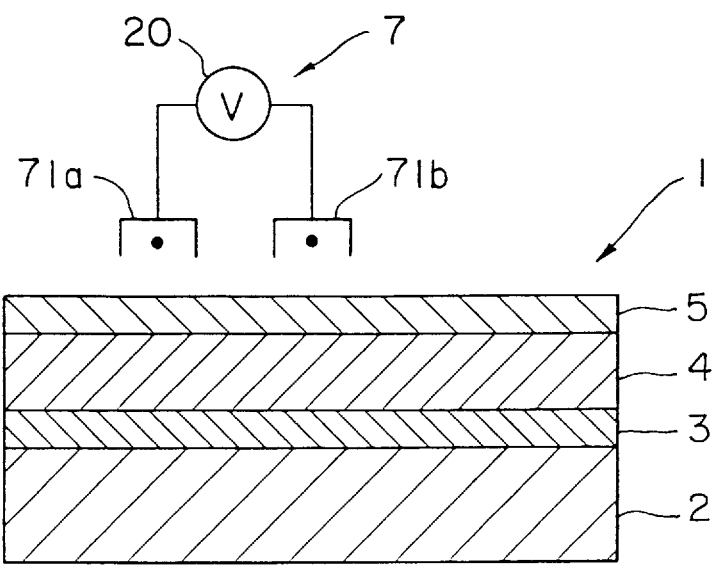
FIG. 4 is a schematic typical view of assistance in explaining a method of and an apparatus for orienting a liquid crystal included in a liquid crystal display medium, in a second embodiment according to the present invention.

A liquid crystal orienting method and a liquid crystal orienting apparatus for orienting a liquid crystal included in a liquid crystal display medium, in a first embodiment according to the present invention will be described with reference to FIGS. 1 to 3.

FIG. 1 is a schematic typical view of assistance in explaining the basic idea of a method of and an apparatus for orienting a liquid crystal included in a liquid crystal display medium, in a first embodiment according to the present invention.

Referring to FIG. 1, a liquid crystal display medium 1 to which the present invention is applied comprises a base 2, a conductive layer 3 overlying the base 2, a PDLC film (polymer dispersed liquid crystal film) 4 overlying the conductive layer 3, and a nonconductive layer 5 overlying the PDLC film 4. The liquid crystal display medium 1 need not necessarily be provided with the nonconductive layer 5. The base 2 is made of an insulating material, such as a plastic sheet. The conductive layer 3 is a conductive coating, an evaporated metal film, such as an ITO film, or an aluminum film or a metal foil.

The PDLC film is, for example, a film of a, material prepared by dispersing a smectic liquid crystal in a polymer matrix. The liquid crystal of the PDLC film can be set in an orderly orientation state, such as a homeotropic orientation state or a homogeneous orientation state by applying an electric field thereto and can be set in a random orientation state by applying heat thereto to change information displayed thereon. The nonconductive layer 5 is a protective layer for protecting the PDLC film, the conductive layer 3 when the PDLC film 4 does not overlie the conductive layer 3 or a printed layer of characters or the like from damage. An electric field is applied to the liquid crystal display medium from the side of a surface 19 of the liquid crystal display medium 1 on the side of the PDLC film 4. Portions of the liquid crystal display medium 1 in which the conductive layer 3 and the PDLC film 4 are superposed are display portions capable of displaying information.

The liquid crystal display medium 1 can be constructed by forming the conductive layer 3 and the PDLC film on a part of the base 2. An intermediate layer 5a may be formed between the PDLC film 4 and the nonconductive layer 5 to prevent the deterioration of the liquid crystal by a solvent that may dissolve in the PDLC film 4 when forming the nonconductive layer 5. If the conductivity of the base 2 is far lower than that of the PDLC film 4, for instance, when the sheet resistivity of the base 2 $10^{12}$ Ω/sq or below, the base 2 may be used and may serve also as the conductive layer 3.

Liquid crystal display mediums 1 employing a PDLC film like the PDLC film 4 are disclosed in JP-A No. 4-71899 and JP-A No. 5-29092 to the applicant of the present patent application. A PDLC film formed by a microcapsule method is particularly desirable in many respects. Films proposed by the applicant of the present invention in JP-A No. 5-301489 and Japanese Patent application Nos. 6-33283, 6-44735 and 6-119702 are possible films.

As shown in FIG. 1, a liquid crystal orienting apparatus 7 for orienting the liquid crystal of the liquid crystal display medium of the present invention comprises at least one charger 71 capable of positively or negatively charging the display surface 19 of the liquid crystal display medium 1 (the surface of the nonconductive layer 5) and at least one grounded electrode 72 to be in contact with the display surface 19. The charger 71 and the electrode 72 are disposed on the side of the PDLC film 4 of the liquid crystal display medium 1. The charger 71 and the electrode 72 form an electrode unit.

The charger 71 is connected to a power unit 20 that applies a voltage to the charger 71 to produce a predetermined potential difference between the charger 71 and the electrode 72. The liquid crystal display medium 1 is conveyed by a known conveying means 74, such as a conveyor belt as shown in FIG. 2 to locate the liquid crystal display medium 1 at a predetermined position relative to the charger 71 and the electrode 72. Therefore, the position of the liquid crystal display medium 1 relative to the charger 71, and the position of the liquid crystal display medium 1 relative to the electrode 72 are variable.

For example, when the electrode 72 of the liquid crystal orienting apparatus 7 is flat as shown in FIG. 1, the liquid crystal display medium is conveyed by and located at a predetermined position, the charger 71 and the electrode 72 are lowered toward the surface 19 of the liquid crystal display medium 1, the electrode 72 is brought into contact with the surface 19, and then an electric field is applied to the liquid crystal display medium 1.

A portion of the surface 19 lying under the charger 71 is charged and a portion in contact with the electrode 72 is grounded. Since the conductive layer 3 is coated entirely with the PDLC film 4 and the PDLC film 4 is covered entirely with the nonconductive layer 5 serving as a protective film as shown in FIG. 1, an electric field is applied perpendicularly to hatched portions 41 of the PDLC film 4 under the charger 71 and the electrode 72, the liquid crystal in those portions 41 of the PDLC film 4 is oriented.

Charging of the surface 19 by the charger 71 and contact between the grounded electrode 72 and the surface 19 need not necessarily be simultaneous, because the surface 19, i.e., the surface of the nonconductive layer 5, is capable of insulation performance and charges on the surface 19 charged by the charger 71 do not disappear immediately. Therefore, the adjustment of the accuracy of the positional relation between the charger 71, the electrode 72 and the liquid crystal display medium 1 can easily be achieved.

Another liquid crystal orienting method and another liquid crystal orienting apparatus 7 for orienting the liquid crystal of the liquid crystal display medium of the present invention will be described with reference to FIG. 2. Referring to FIG. 2, the liquid crystal orienting apparatus 7 comprises a central charger 71, a pair of rotating grounding electrodes 72a and 72b disposed above and below the charger 71, respectively, with respect to a direction in which the liquid crystal display medium 1 is conveyed and a pair of pressure rollers 73 of an elastic material, such as rubber, or a metal, disposed opposite to the grounding rollers 72a and 72b to press the liquid crystal display medium 1 securely against the grounding rollers 72a and 72b, respectively. The liquid crystal display medium 1 is conveyed by a conveying means 74, such as a conveyor belt, from the left toward the right, as viewed in FIG. 2, to move past the grounding roller 72a, the charger 71 and the grounding roller 72b. The charger 71 and the grounding rollers 72a and 72b are retained at predetermined positions, respectively, and the liquid crystal display medium 1 is moved to orient the liquid crystal in desired portions of the liquid crystal display medium 1.

The charger 71 need not necessarily be used in combination with the pair of grounding rollers 72a and 72b as shown in FIG. 2. In FIG. 2, the grounding roller 72b is disposed below the charger 71 with respect to the direction in which the liquid crystal display medium 1 is conveyed, a fixed potential difference is created between the charger 71 and the grounding roller 72b, and the grounding roller 72b is grounded. Therefore, charge on the liquid crystal display medium 1 is removed through the grounding roller 72b after liquid crystal orienting process and hence any further step of removing charge from the liquid crystal display medium 1 is not necessary. Thus, the downstream grounding roller 72b serves also as a charge removing roller. Therefore, the grounding roller 72b is disposed behind the charger 71, and a fixed potential difference is created between the charger 71 and the grounding roller 72b to use the grounding roller 72b for both electric field application and charge removal. A plurality of charge removing grounding rollers like the grounding roller 72b will ensure charge removal.

The chargers 71 of the liquid crystal orienting apparatuses 7 shown in FIGS. 1 and 2 may be generally known chargers, such as corotron chargers having a tungsten wire and a guard electrode or scorotron chargers formed by adding a grid electrode to a corotron charger.

There is no restriction on the shape of the electrode 72; the electrode 72 may be formed in the shape of a roller like the grounding rollers 72a and 72b or a drum having a portion formed in the shape of a circular arc. Suitable materials for forming the electrode 72 are metals, such as aluminum, copper, nickel and stainless steels, pliant plastic materials or rubber containing a conductive material, such as carbon black or metal powder. Usually, the surface with which the electrode 72 is brought into contact is not a perfect mirror surface. Therefore, when the electrode 72 has the shape of a flat plate, it is preferable to make the electrode 72 of an elastic, soft material prepared by mixing a conductive material, such as carbon black, and urethane or rubber and to coat the surface of the electrode with a metal film by plating or the like. An elastic member, such as a rubber member, may be provided opposite to the electrode 72 with respect to the liquid crystal display medium 1. The elastic electrode 72 is able to come into uniform, firm contact with the surface of the liquid crystal display medium 1, conforming to irregularities in the surface of the liquid crystal display medium 1. When the electrode 72 is formed in the shape of a roller or a drum having a portion formed in the shape of a circular arc, the electrode 72 is able to come into smooth rolling contact with the liquid crystal display medium 1.

In the liquid crystal orienting apparatus shown in FIG. 2, the charger 71 and the grounding rollers 72a and 72b are held in place and the liquid crystal display medium 1 is moved by the conveying means 74 to orient the liquid crystal in optional portions of the liquid crystal display medium 1 is oriented. However, it is also possible to hold the liquid crystal display medium 1 at a predetermined position, to roll the grounding rollers 72a and 72b on the surface of the liquid crystal display medium 1 and to move the charger 71 in parallel to the liquid crystal display medium 1. It is also possible to move the charger 71 and the grounding rollers 72a and 72b all together and to move the liquid crystal display medium 1 while the charger 71 and the grounding rollers 72a and 72b are moved.

At least the charger 71 or the electrode 72 must be disposed on the PDLC film 4 when the PDLC film 4 is formed in part of the liquid crystal display medium 1. When the PDLC film 4 is formed over the entire part of the liquid crystal display medium 1, the charger 71 or the electrode 72 may be disposed on the surface of the conductive layer 3 when the liquid crystal display medium 1 is provided with the conductive layer 3 or on the surface of the base 2 when the base 2 serves also as the conductive layer 3.

When the liquid crystal orienting apparatus 7 is further provided with a heating roller 75 as shown in FIG. 2 to heat the PDLC film 4 of the liquid crystal display medium 1, the liquid crystal of the PDLC film 4 can be oriented by creating a smaller potential difference. The orienting performance of the PDLC film 4 is dependent on the intensity of the electric field. When charging is used for orienting the liquid crystal, the orienting performance is dependent on the potential difference between the surface of the liquid crystal display medium 1 and the conductive layer 3. The absolute value of charging voltage necessary for charging must be several thousands volts or higher and the absolute value of charging voltage is dependent on the distance between the liquid crystal display medium 1 and the charger 71 and charging time. It is difficult to orient the PDLC film 4 by moving the liquid crystal display medium 1 or the charger 71 at a high moving speed, charging the liquid crystal display medium 1 for a relatively short charging time and charging the liquid crystal display medium 1 at a relatively low surface potential for rapid processing. In such a case, the liquid crystal can easily be oriented even if the PDLC film 4 is charged at a relatively low potential to achieve rapid orienting when the PDLC film 4 is heated to enhance the orienting performance thereof.

When the PDLC film 4 contains, for example, a smectic liquid crystal that assumes a nematic phase at a high temperature and is heated, the liquid crystal can be oriented in the range of a nematic phase. Therefore, the liquid crystal can be oriented by an electric field of a further lower intensity. When the PDLC film 4 contains a liquid crystal which assumes a nematic phase while the same in an isotropic phase is cooled, the liquid crystal can be oriented by creating a small potential difference during the process of cooling after heating the PDLC film 4 to a temperature at which the liquid crystal assumes an isotropic phase. Accordingly, the liquid crystal can surely and quickly be oriented. Consequently, the danger of damaging the liquid crystal display medium by discharge or the like due to the high surface potential of the liquid crystal can be avoided. Heating rollers may be disposed on the side of the opposite surfaces of the liquid crystal display medium 1 instead of disposing only the heating roller 75 on the side of the PDLC film 4 of the liquid crystal display medium 1.

As is apparent from the foregoing description, the method and the apparatus for orienting the liquid crystal of the liquid crystal display medium 1 are featured by electric field application by the charger 71 and the grounded electrode 72.

Incidentally, the following methods are available for applying an electric field to the liquid crystal display medium 1.

A method (1) disclosed in JP-A No. 4-71899 brings a grounded electrode into contact with an exposed conductive layer to ground the conductive layer, and charges a PDLC film at a potential with an electrode charged at a potential and brought into contact with the surface of a PDLC film or with a charger.

A method (2) disclosed in Japanese Patent Application No. 6-103249 filed by the applicant of the present patent application charges an exposed conductive layer having exposed side surfaces at a potential with an electrode charged at a potential and brought into contact with conductive layer or with a charger, and grounds the surface of a PDLC film by bringing a grounding electrode into contact with the surface of the PDLC film.

The methods (1) and (2) have the following advantages and disadvantages.

The methods (1) and (2) need to bring the electrode into contact with the conductive layer and hence the conductive layer must be exposed. Consequently, breakage of the conductive layer by discharge due to flaws in the conductive layer or unsatisfactory contact between the electrode and the conductive layer is liable to occur. Although the method (2) is able to charge the conductive layer in a noncontact mode, the exposed conductive layer is subject to damage during transportation. The conductive layer having partly exposed side surfaces necessary for carrying out the method (2) is subject to deterioration.

In the liquid crystal display medium 1 of the present invention, the upper surface of the conductive layer 3 is covered entirely with the PDLC film 4 and the conductive layer 3 need not have any portions extending beyond the PDLC film 4. Consequently, the PDLC 4 forming a display portion can be formed in a large size over the entire surface of the liquid crystal display medium 1 and there are less restrictions on the construction of the liquid crystal display medium 1. Even if the conductive layer 3 and the PDLC film 4 including their side surfaces are covered with the protective layer 5 or the like, the liquid crystal can be oriented.

There is no possibility of faulty contact that is possible when the electrodes are used when charging is used. Therefore, when the charger 71 and the electrodes 72 are used in combination, the number of the electrodes 72 can be reduced by half and, consequently, the probability of occurrence of faulty contact is reduced by half. Consequently, a stable electric field can be applied to the liquid crystal display medium 1 and power consumption when only one charging cycle is necessary is lower than that when a plurality of charging cycles are necessary. Since the charger 71 and the electrodes 72 are used in combination, the miniaturization of the liquid crystal orienting apparatus can easily be achieved.

The liquid crystal of the liquid crystal display medium can be oriented even if the conductive layer 3 and the PDLC film 4 are cored with the nonconductive layer 5, such as a protective layer.

When the grounded grounding roller 72b is used also for removing residual charge remaining on the surface of the liquid crystal display medium 1, the liquid crystal orienting apparatus need not be provided with an additional means for removing the residual charge.

The liquid crystal orienting apparatus contributes to the enhancement of the durability and reliability of the liquid crystal display medium 1 because the same is capable of orienting the liquid crystal of the liquid crystal display medium 1 having the nonconductive layer 5, such as a protective layer, covering the conductive layer 3 and the PDLC film 4, has the advantages of both the charging system and the electrode system, and is free from the disadvantages of both the charging system and the electrode system. The use of the grounding roller 72b also as a charge removing device solves problems attributable to residual charges that are inevitable to the charging system and enables the use of the charging system that functions in a noncontact mode.

When the liquid crystal orienting apparatus is provided with the least necessary number of grounding rollers, the possibility of damaging the liquid crystal display medium 1 will be reduced.

An orientation state of the liquid crystal of the liquid crystal display medium 1 attained by the liquid crystal orienting method and the liquid crystal orienting apparatus in accordance with the present invention, as contrasted with a random orientation state, is a regular orientation state, such as a homeotropic orientation state or a homogeneous orientation state. Such a regular orientation state may be used as either a displaying state or an erasing state of the liquid crystal display medium 1.

The liquid crystal orienting method and the liquid crystal orienting apparatus in accordance with the present invention are particularly suitable for setting the entire display area of the liquid crystal display medium 1 in an orientation state and most suitable for erasing displayed information. However, the use of the liquid crystal orienting method and the liquid crystal orienting apparatus in accordance with the present invention is not limited to erasing displayed information, but may be writing information to the liquid crystal display medium 1. When writing information to the liquid crystal display medium, an electric field must be applied in a pattern to the liquid crystal display medium 1 and the charger 71 is not an optimum means for such a purpose. Information can be written to the liquid crystal display medium 1 by bringing only the electrode 72 formed in the shape of a matrix into contact with the liquid crystal display medium 1.

EXAMPLE

The present invention will more concretely described in connection with an example thereof and a comparative example. The liquid crystal orienting method and the liquid crystal orienting apparatus in accordance with the present invention were evaluated by the following method.

Liquid Crystal Orienting Apparatus (Erasing Apparatus)

As shown in FIG. 2, a liquid crystal orienting apparatus 7 is designed to deal with a liquid crystal display medium 1 (liquid crystal display card) of 85 mm in length and 54 mm in width, and has a conveying means 74, i.e., a conveyor belt, that conveys the liquid crystal display medium 1 with its long sides extended in parallel to the conveying direction, one stationary corona charger 71, and a pair of stationary, rotating, grounded, grounding rollers 72a and 72b. The grounding rollers 72a and 72b were disposed above and below the corona charger 71, respectively, with respect to a direction in which the liquid crystal display medium 1 is conveyed. The grounding rollers 72a and 72b were metal rollers of 60 mm in length and 10 mm in diameter capable of being in contact with the entire width of the liquid crystal display medium 1. The distance between the axis of rotation of each of the grounding rollers 72a and 72b, and the discharge wire, such as a tungsten wire, of the charger 71 was 10 mm. The liquid crystal display medium 1 was conveyed by the conveying means 74, such as a conveyor belt, past the grounding rollers 72a and 72b and the charger 71, and an electric field was applied to the liquid crystal display medium 1 as the same moves past the grounding rollers 72a and 72b and the charger 71.

Writing Apparatus

A thermal head (resolution: 6 dot/mm, heating capacity: 0.4 mJ/dot), not shown, designed for use on a thermal printer was used for writing information.

Fabrication of Sample Liquid Crystal Display Medium

A conductive layer 3 of ITO was formed on a 188 μm thick transparent polyethylene terephthalate film from which a base 2 is formed. A 1 μm thick adhesive layer was formed over the entire surface of the conductive layer 3 by spreading a polyester/urethane adhesive, a 10 μm thick PDLC film 4 of a composition, which will be described later, was formed by spreading a material in a film and drying the film. An ultraviolet setting resin (Seika Beam, Dainichi Seika Kogyo) was spread in a film over the entire surface of the PDLC film 4 and the film was hardened to form a 2 μm thick protective layer (nonconductive layer) 5. Then, a 85 mm×54 mm liquid crystal display medium 1 having one display surface was cut out from the thus fabricated structure by punching. A random orientation state of the liquid crystal display medium 1 was used as a displaying state, and a homeotropic orientation state of the same was used as an erasing state. A dichroic dye makes the display surface assume black in the displaying state and white in the erasing state.

PDLC Film

The PDLC film contains, as principal components, the following materials including a liquid crystal and a dichroic dye. The PDLC film was formed by spreading a microcapsulated dispersed coating liquid prepared by dispersing a liquid crystal (and a dichroic dye) by an in situ polymerizing method using an ultrasonic dispersion process.

Smectic liquid crystal: S-6, Merk Japan Co.

Dichroic dye: S-428, Mitsui Toatsu Kagaku K. K. (Black/transparent dichromatism)

Microcapsules: In situ polymerized methylmethacrylate

Protective colloid/polymer matrix: Polyvinyl alcohol KP-06, Nippon Gosei Kagaku Kogyo K. K.

Thickener/Matrix: Polyvinyl alcohol KH-20, Nippon Gosei Kagaku Kogyo K. K.

Liquid crystal/Matrix Ratio: 1/1

Result of Liquid Crystal Orienting Process (Result of Erasing Process)

The liquid crystal display medium 1 was subjected to an erasing process on the liquid crystal orienting apparatus 7, in which the output voltage of the corona charger 71 was +5 kV and the corona charger 71 was spaced 3 mm apart from the display surface of the liquid crystal display medium 1 while the liquid crystal display medium 1 was conveyed at 500 mm/sec.

Since the liquid crystal of the liquid crystal display medium 1 as fabricated was in a random orientation state, the entire surface of the liquid crystal display medium 1 was black, i.e., the entire surface was in a displaying state. When subjected to the erasing process on the liquid crystal orienting apparatus 7, the color of the PDLC film 4 changed from black to white, i.e., the entire display surface of the liquid crystal display medium 1 changed from the displaying state to an erasing state. Then, characters were written to the liquid crystal display medium 1 by a writing apparatus, the liquid crystal display medium 1 was subjected to the erasing process on the liquid crystal orienting apparatus 7 to set the entire display surface in an erasing state. The contrast between the written characters and their background was not lowered and the PDLC film 4 of the liquid crystal display medium 1 was not broken after a rewriting process was repeated 1000 cycles, which proved the satisfactory effect of the present invention. Since the conductive layer 3 is protected by the PDLC film 4 and the protective layer 5, and the PDLC film 4 is protected by the protective layer 5, no defect developed in the conductive layer 3 and the PDLC film 4, and stable rewriting could be achieved.

COMPARATIVE EXAMPLE

Liquid Crystal Orienting Method (Erasing Apparatus)

A liquid crystal orienting method illustrated in FIG. 3 was employed. A liquid crystal display medium 1 having components made of the same materials as those of the components of the liquid crystal display medium 1 shown in FIG. 1 was fabricated. A PDLC film 4 was formed on a portion of a conductive layer 3 so that the conductive layer 3 is partially exposed. The liquid crystal display medium 1 was not provided with any layer corresponding to the protective layer 5 of the liquid crystal display medium 1 of FIG. 1. A grounded electrode 72 was brought into contact with the conductive layer 3, and an electrode 76 was brought into contact with the PDLC film 4 for erasing. The potential difference between the electrodes 72 and 76 was 300 V. The electrodes 72 and 76 were roller electrodes.

Result of Liquid Crystal Orienting Process (Result of Erasing Process)

When the aforesaid erasing process was repeated, flaws attributable to repeated conveying actions or the like were made in the surface of the liquid crystal display medium 1, and defects developed in a portion of the conductive layer 3 exposed on the surface of the liquid crystal display medium 1. When an electric field was applied to the liquid crystal display medium 1 having those flaws and defects for an erasing process by the method illustrated in FIG. 3, electric discharge occurred at the defects in the conductive layer 3, the destruction of the conductive layer developed, the erasing performance deteriorated, perfect erasing could not be achieved, and the erasing process became ineffective after the erasing process was repeated 10 cycles.

As is apparent from the test results, since the conductive layer 3 of the liquid crystal display medium 1 may be covered entirely with the PDLC film 4, the conductive layer 3 need not have any portion extending beyond the periphery of the PDLC film 4 to form a terminal or the like and the display part of the PDLC film 4 can be formed on the entire surface of the liquid crystal display medium 1. The display part can be formed in an optional portion of the liquid crystal display medium 1 and there are only a few restrictions on the construction of the liquid crystal display medium.

Second Embodiment

A noncontact liquid crystal orienting method and a liquid crystal orienting apparatus in a second embodiment according to the present invention will be described with reference to the accompanying drawings.

Figure 5:
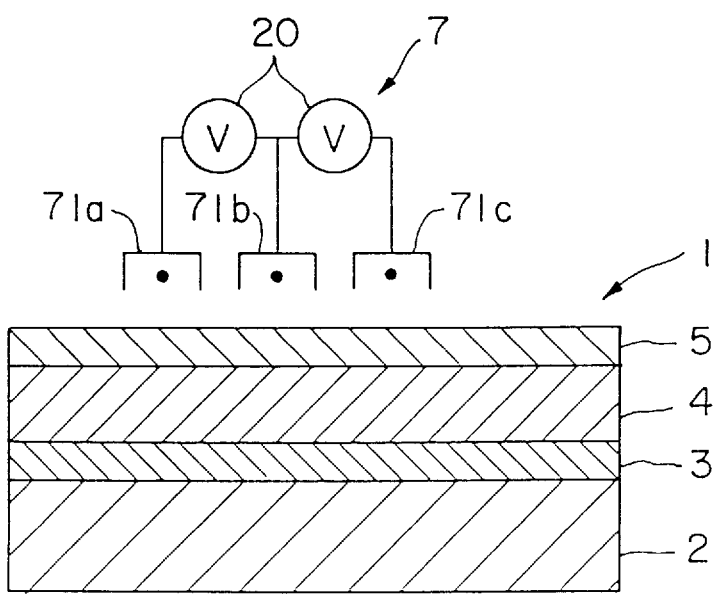
FIG. 5 is a schematic typical view of assistance in explaining a method of and an apparatus for orienting a liquid crystal included in a liquid crystal display medium, in a further embodiment according to the present invention.
Figure 6:
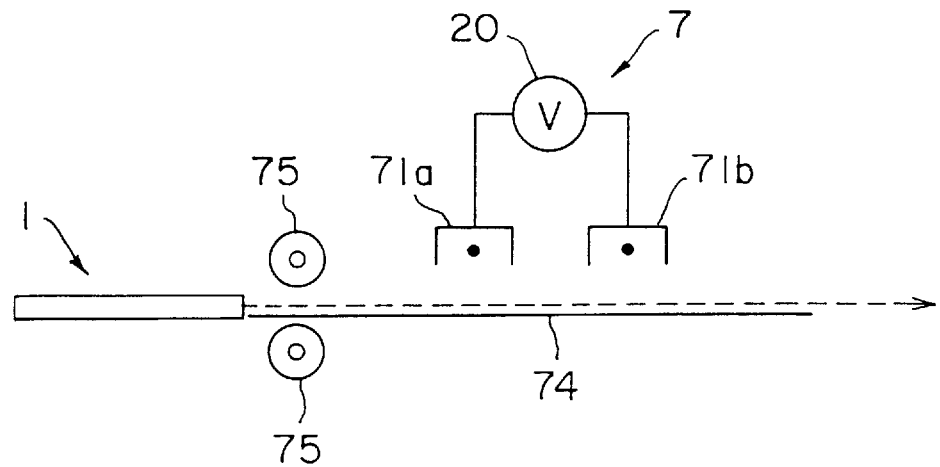
FIG. 6 is a schematic typical view of assistance in explaining a method of and an apparatus for orienting a liquid crystal included in a liquid crystal display medium, in a still further embodiment according to the present invention.

FIGS. 4 to 6 are a schematic typical views of assistance in explaining a liquid crystal orienting method and a liquid crystal orienting apparatus in a second embodiment according to the present invention. Referring to FIG. 4, a liquid crystal display medium 1 comprises, as principal components, a base 2 of an insulating material, such as a plastic material, a conductive layer 3, a PDLC film (polymer dispersed liquid crystal film )4 and, when necessary, a protective layer 5. The conductive layer 3 is a transparent electrode of an ITO film or the like, an evaporated metal film, such as an aluminum film, or a metal foil. The PDLC film is, for example, a film of a material prepared by dispersing a smectic liquid crystal in a polymer matrix. The liquid crystal of the PDLC film can be set in a random orientation state when the same is cooled after being heated to a temperature equal to or above the phase transition temperature thereof and can be set in a vertical or horizontal orientation state when an electric field is applied thereto. Thus, the orientation of the liquid crystal of the PDLC film 4 is changed for rewriting information. The protective layer 5 protects the PDLC film and the like from damage. The protective layer 5 may be a laminated film or a film formed by spreading a liquid resin. Portions of the liquid crystal display medium 1 in which the conductive layer 3 and the PDLC film 4 are superposed are display portions capable of displaying information. The liquid crystal display medium 1 may locally be provided with a display portion or display portions.

Referring to FIG. 4, a liquid crystal orienting apparatus 7 discharges positive or negative ions to charge the surface of the liquid crystal display medium 1 on the side of the PDLC film 4. The liquid crystal orienting apparatus 7 is provided with chargers 71a and 71b for positive or negative charging. The chargers 71a and 71b may be held stationary at positions corresponding to optional positions on the liquid crystal display medium 1 or may be moved to positions corresponding to optional positions on the liquid crystal display medium 1. When the chargers 71a and 71b are to be moved, the liquid crystal orienting apparatus 7 is provided with driving belts, not shown, or the like.

When the liquid crystal display medium 1 is to be moved, the liquid crystal orienting apparatus 7 is provided with a conveying means 74 (FIG. 6), such as a movable table or the like. The positional relation between the chargers 71a and 71b, and the liquid crystal display medium can be determined by moving the chargers 71a and 71b, and the liquid crystal display medium relative to each other. Therefore, either the chargers 71a and 71b, or the liquid crystal display medium or both the chargers 71a and 71b, and the liquid crystal display medium are moved.

The plurality of chargers 71a and 71b may be grid chargers 71a and 71b each having a matrix of charging elements, and the charging potentials of the chargers 71a and 71b may be varied with time to change the orientation of the liquid crystal at desired points on the PDLC film 4.

The noncontact liquid crystal orienting method of the present invention is carried out by the liquid crystal orienting apparatus 7 shown in FIG. 4. The chargers 71a and 71b connected to a power supply unit 20 charge portions of the surface of the liquid crystal display medium 1 overlying the conductive layer 3 positively and negatively by corona discharge. For instance, the charger 71a and the charger 71b are charged with positive ions and negative ions, respectively, or conversely. At least one charged portion is a portion of the surface over the PDLC film 4. Within a range shown in FIG. 4, the PDLC film 4 is formed over the entire surface of the conductive layer 3, and the protective layer 5 is formed over the entire surface of the PDLC film 4. Therefore, the chargers 71a and 71b charge the protective layer 5 covering the PDLC film 4.

Consequently, an electric field is created between the charged surface and the conductive layer 3 by electrostatic induction in two portions of the surface of the liquid crystal display medium 1 positively and negatively charged by the chargers 71a and 71b, respectively, whereby the liquid crystal is oriented vertically or horizontally.

If the sheet resistivity is low enough to allow charges to move along the surface between the two adjacent charged portions or the adjacent charged portions are excessively close to each other, a path for the electric field along the surface takes precedence over a path through the PDLC film 4 and the electric field cannot preferentially be applied to the PDLC film 4. Therefore, it is preferable to form the PDLC film 4 of a highly insulating material and to secure an interval large enough to suppress aerial discharge between the charged portions of the surface.

The chargers 71a and 71b of the liquid crystal orienting apparatus 7 may be any generally known chargers, such as corotron charges having a tungsten wire and a guard electrode or scorotron chargers formed by adding a grid electrode to a corotron charger.

In the liquid crystal orienting apparatus 7, the positive charger 71a and the negative charger 71b may be arranged in a line opposite to one surface of the liquid crystal display medium 1 as shown in FIG. 4, a plurality of pairs each of a positive charger and a negative charger may be arranged in a line opposite to one surface of the liquid crystal display medium 1 or three chargers, i.e., a positive charger 71a, a negative charger 71b and a positive or negative charger 71c, may be arranged in a line.

The liquid crystal orienting apparatus 7 may be provided with one charger 71, and the polarity of the charger 71 may be switched for positive and negative charging while the liquid crystal display medium 1 or the charger 71 is moved to apply an electric field to a desired portions of the liquid crystal display medium 1.

The liquid crystal is oriented when an electric field of an intensity exceeding a threshold is applied to the PDLC film. It is preferable to charge portions of the PDLC film 4 at equal potentials so that residual charge can be removed and no residual charge remains on the PDLC film 4 after the liquid crystal orienting process. If any charge remains on the PDLC film 4, the charge can be removed by grounding the PDLC film 4.

The liquid crystal orienting apparatus 7 of the present invention may be provided with heating means 75 for heating the PDLC film 4 to enable the use of a lower voltage for liquid crystal orienting. in a liquid crystal orienting apparatus 7 shown in FIG. 6 is provided with heat rollers 75 as the heating means 75. When the liquid crystal display medium 1 is treated by a liquid crystal orienting apparatus 7 shown in FIG. 6, the liquid crystal display medium 1 is is moved into a charging region after being heated by the heating means 74, i.e., the heat rollers, disposed on the sides of the upper and the lower surface of the liquid crystal display medium 1.

When the liquid crystal of the PBLC film 4 is heated, the liquid crystal changes, for instance, from a smectic phase to a nematic phase, so that the liquid crystal can be oriented by an electric field of a further lower field intensity. Although the output of the chargers cannot remarkably reduced because the absolute value of the output of the chargers necessary for effecting charging is 5 kV or above, the liquid crystal display medium 1 can be conveyed by a conveying means 74 for erasing at an increased conveying speed when the PDLC film 4 is heated.

EXAMPLE

The present invention will more concretely be described in connection with an examples thereof. In the following description, "parts" signifies "parts by weight", and "%" signifies "percent by weight" unless otherwise specified.

Fabrication of Liquid Crystal Display Medium

A conductive layer 3 of ITO was formed on a 188 μm thick transparent polyethylene terephthalate film having a sheet resistivity of $10^2$ Ω/sq from which a base 2 is formed. A 10 μm thick PDLC film 4 was formed over the entire surface of the conductive layer 3 by spreading a material in a film and drying the film. An ultraviolet setting resin (Seika Beam, Dainichi Seika Kogyo) was spread in a film over the entire surface of the PDLC film 4 and the film was hardened to form a 2 μm thick protective layer 5. Then, a 85 mm×54 mm cardlike liquid crystal display medium 1 was cut out from the thus fabricated structure by punching. A random orientation state of the liquid crystal display medium 1 was used as a displaying state, and a vertical orientation state of the same was used as an erasing state.

The PDLC film 4 was formed by spreading a microcapsulated dispersed coating liquid prepared by dispersing a liquid crystal (and a dichroic dye) by an in situ polymerizing method using an ultrasonic dispersion process. The PDLC film 4 contains, as principal components, the following materials.

Smectic liquid crystal: S-6, Merk Japan Co.

Dichroic dye: S-428, Mitsui Toatsu Kagaku K. K. (Black/transparent dichromatism)

Microcapsules: In situ polymerized methylmethacrylate

Protective colloid/polymer matrix: Polyvinyl alcohol KP-06, Nippon Gosei Kagaku Kogyo K. K.

Thickener/Matrix: Polyvinyl alcohol KH-20, Nippon Gosei Kagaku Kogyo K. K.

Liquid crystal/Matrix Ratio: 1/1

Liquid Crystal Orienting Apparatus

A liquid crystal orienting apparatus (erasing apparatus) as shown in FIG. 6 has corona chargers (corotrons) 71a and 71b respectively for positive ions and negative ions. The corona chargers 71a and 71b are spaced 10 mm apart, arranged in a line and disposed so as to be spaced from the liquid crystal display medium.

Writing Process

The PDLC film was heated by a thermal printer of 6 dot/mm in resolution and 0.4 mJ/dot in heating capacity to write information to the liquid crystal display medium.

The liquid crystal of the liquid crystal display medium 1 as fabricated is in a random orientation state, and the entire surface of the liquid crystal display medium 1 is black.

Result of Liquid Crystal Orienting Process (Result of Erasing Process)

The liquid crystal display medium 1 was subjected to an erasing process on the liquid crystal orienting apparatus 7. The two chargers 71a and 71b were spaced 3 mm from the surface of the liquid crystal display medium 1, +5 kV was applied to the charger 71a, −5 kV was applied to the charger 71b, and the liquid crystal display medium was charged by corona discharge while the same is conveyed at a conveying speed of 30 m/min.

The conductive layer 3 served as a horizontal, transverse charge transfer path, the PDLC film changed from a black state to a transparent state, i.e., an erasing state.

Result of Evaluation

The ability of the liquid crystal display medium 1 to withstand repeated writing and erasing cycles, i.e., the rewriting withstand ability, was satisfactory, The liquid crystal display medium withstood 1000 or above rewriting cycles, which proved the excellent effect of the liquid crystal orienting method and the liquid crystal orienting apparatus of the present invention.

Although the thermal head of the thermal printer touches the liquid crystal display medium 1 during the writing process, the information written to the liquid crystal display medium 1 can be erased by the noncontact erasing process and the conductive layer is protected by the PDLC film and the protective layer. Accordingly, defects, such as flows, were not formed in the conductive layer and uniform, stable rewriting could be achieved.

As described above, the liquid crystal orienting method and the liquid crystal orienting apparatus applies an electric field to the liquid crystal display medium by the charging agency of charged particles discharged from the chargers to orient the liquid crystal in a noncontact mode. Accordingly, the present invention solves problems resulting from the breakage of the conductive layer caused by discharge due to faulty grounding, which occurs when the liquid crystal is oriented by a conventional liquid crystal orienting method that applies an electric field to the liquid crystal display medium by grounding the conductive layer exposed on the surface of the liquid crystal display medium.

The liquid crystal in portions of the surface of the liquid crystal display medium charged with charged particles discharged by the chargers is oriented and hence the liquid crystal can uniformly be oriented in the entire surface of the liquid crystal display medium except the liquid crystal in portions having projections on which charge is concentrated.

Third Embodiment

A liquid crystal orienting method and a liquid crystal orienting apparatus in a third embodiment according to the present invention will be described hereinafter with reference to FIGS. 7 to 9.

Figure 7:
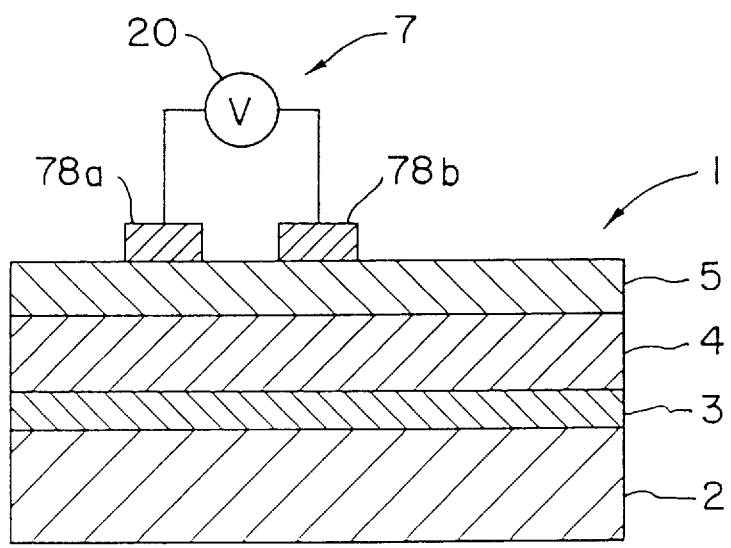
FIG. 7 is a schematic typical view of assistance in explaining a method of and an apparatus for orienting a liquid crystal included in a liquid crystal display medium, in a third embodiment according to the present invention.

Referring to FIG. 7 illustrating the liquid crystal orienting method and the liquid crystal orienting apparatus in a schematic view, a liquid crystal display medium 1 comprises a base 2, a conductive layer 3, a PDLC film (polymer dispersed liquid crystal film) 4 and, when necessary, a protective layer 5. The base 2 is made of an ordinary insulating material, such as a plastic sheet. The conductive layer 3 is a transparent electrode of an ITO film an evaporated metal film, such as an aluminum film, or a metal foil. The PDLC film is, for example, a film of a material prepared by dispersing a smectic liquid crystal in a polymer matrix. The liquid crystal of the PDLC film can be set in a random orientation state by heat and set in a vertical or horizontal orientation state by an electric field to rewrite information displayed thereon. The protective layer 5 protects the PDLC film and such from damage. The protective layer 5 may be a laminated film or a film formed by spreading a liquid resin. Portions of the liquid crystal display medium 1 in which the conductive layer 3 and the PDLC film 4 are superposed are display portions capable of displaying information. The liquid crystal display medium 1 may locally be provided with a display portion or display portions.

The liquid crystal orienting apparatus 7 is provided with at least a pair of chargers 78a and 78b of different potentials for giving potentials to the surface of the liquid crystal display medium 1 on the side of the PDLC film 4. The chargers 78a and 78b may be held stationary at positions corresponding to optional positions on the liquid crystal display medium 1 or may be moved to positions corresponding to optional positions on the liquid crystal display medium 1. When the chargers 78a and 78b are to be moved, the liquid crystal orienting apparatus 7 is provided with an electrode moving means, not shown, including driving belts, vertically moving mechanism and such. When the liquid crystal display medium 1 is to be moved, the liquid crystal orienting apparatus 7 is provided with a conveying means 74 (FIG. 9), such as a movable table or the like. The positional relation between the chargers 78a and 78b, and the liquid crystal display medium 1 can be determined by moving the chargers 78a and 78b, and the liquid crystal display medium 1 relative to each other. Therefore, either the chargers 78a and 78b, or the liquid crystal display medium 1 or both the chargers 78a and 78b, and the liquid crystal display medium 1 are moved.

The liquid crystal orienting method of the present invention is carried out by the liquid crystal orienting apparatus 7 shown in FIG. 7. The chargers 78a and 78b connected to a power supply unit 20 charge portions of the surface of the liquid crystal display medium 1 overlying the conductive layer 3 at different potentials. For instance, the charger 78a charges the corresponding portion at a positive potential and the charger 78b charges the corresponding portion at a null potential. (Since it is necessary to charge the portions only at different potentials, respectively, the portions may be charged positively and negatively, respectively.) At least a portion of each of the electrodes 78a and 78b must be in contact with a portion of the surface over the PDLC film 4. Within a range shown in FIG. 7, the PDLC film 4 is formed over the entire surface of the conductive layer 3, and the protective layer 5 is formed over the entire surface of the PDLC film 4. Therefore, the chargers 78a and 78b are in contact with the surface of the protective layer 5 covering the PDLC film 4.

Consequently, a potential difference corresponding to the difference between $V_a$ and $V_b$ is created across a path $V_a$ protective layer 5-PDLC film 4-conductive layer 3-PDLC film 4-protective layer 5-$V_b$, the conductive layer 3 serves as a transverse path, and a electric field is applied perpendicularly to horizontally spaced portions of the PDLC film 4, so that the liquid crystal is oriented vertically or horizontally.

If the resistance of a portion of the surface between the adjacent potions of the surface with which the electrodes 78a and 78b are in contact is low enough to make a current flow through the surface between the adjacent portions in contact with the electrodes 78a and 78b preferentially to the path perpendicularly extending through the PDLC film 4 or the adjacent portions in contact with the electrodes 78a and 78b are excessively close to each other, a path for the electric field along the surface takes precedence over the path perpendicularly extending through the PDLC film 4 and the electric field cannot preferentially be applied to the PDLC film 4. Though dependent on the thickness of the protective layer, it is necessary that the protective layer 5 has a volume resistivity higher than that of the underlying layer.

In the liquid crystal orienting apparatus 7, the electrodes 78a and 78b of different potentials may be arranged in a line opposite to one surface of the liquid crystal display medium 1 as shown in FIG. 7. The liquid crystal orienting apparatus 7 may be provided with a plurality of pairs each of electrodes 78a and 78b of different potentials or three chargers, i.e., a positive charger 71a, electrodes 78a and 78b of different potentials and an electrode 78c of a third potential different from those of the electrodes 78a and 78b. The third potential of the electrode 78c may be equal to that of the electrode 78a provided that the same is different from the potential of the adjacent electrode 78b ($V_a=V_c$ in FIG. 8).

At least two electrodes must be in contact with the liquid crystal display medium 1. The liquid crystal orienting process is possible when at least two electrodes of different potentials are in contact with the liquid crystal display medium 1.

For instance, when creating a potential difference of 300 V between the electrodes 78a and 78b of different potentials, the potential of the electrode 78a may be 0 V, i.e., a ground potential, and that of the electrode 78b may be +300 V or the former potential may be −150 V and the latter potential may be +150 V. The voltages to be applied to the electrodes 78a and 78b may be either ac voltages or dc voltages.

Suitable materials for forming the electrodes 78a and 78b are metals, such as aluminum, copper and nickel, transparent conductive films, such as ITO films, soft plastic materials or rubber containing a conductive material, such as carbon black or metal powder.

Usually, the surface with which the electrodes 78a and 78b are brought into contact is not a perfect mirror surface. Therefore, it is preferable that the electrodes 78a and 78b are elastic electrodes made of a pliant material prepared by mixing a conductive material, such as carbon black, and urethane rubber or rubber, and coated with a metal film by plating or the like. An elastic member, such as a rubber member, may be provided opposite to the electrodes 78a and 78b with respect to the liquid crystal display medium 1. When thus pressed against the liquid crystal display medium 1, the electrodes 78a and 78b are able to come into uniform, firm contact with the surface of the liquid crystal display medium 1, conforming to irregularities in the surface of the liquid crystal display medium 1. If the electrodes 78a and 78b are in faulty contact with the surface of the liquid crystal display 1, there is a possibility that the liquid crystal display medium is destructed by aerial discharge.

The electrodes 78a and 78b may be formed in a flat shape having a flat contact surface as shown in FIG. 7 or may be formed in the shape of a roller as shown in FIG. 9. In a liquid crystal orienting apparatus 7 shown in FIG. 9, two roller electrodes 78a and 78b are in rolling contact with the surface extending over the PDLC film 4. Rubber rollers 73 supported for rotation may be disposed opposite to the roller electrodes 78a and 78b to hold the liquid crystal display medium 1 being conveyed between the roller electrodes 78a and 78b, and the rubber rollers 73 to secure firm contact between the roller electrodes 78a and 78b, and the liquid crystal display medium 1.

The electrodes 78a and 78b to come into contact with the surface extending over the PDLC film 4 may be roller electrodes, and other electrodes to come into contact with non displaying portions of the surface of the liquid crystal display medium 1 may be flat electrodes that are pressed against the surface of the liquid crystal display medium 1 and move together with the liquid crystal display medium 1.

The positional relation between the liquid crystal display medium 1 and the electrodes 78a and 78b must optionally be determined to orient the liquid crystal in an optional portion of the PDLC film 4. The liquid crystal display medium 1 mounted on the conveying means 74, such as a conveyor or a conveying table, may be brought into continuous contact with the electrodes 78a and 78b when the electrodes 78a and 78b are roller electrodes held stationary at fixed positions on the liquid crystal orienting apparatus, or the liquid crystal display medium 1 may be held at a fixed position, and the roller electrodes 78a and 78b may be moved so as to roll along the surface of the liquid crystal display medium 1 or both the liquid crystal display medium 1 and the roller electrodes 78a and 78b may be moved to bring the roller electrodes 78a and 78b into rolling contact with the liquid crystal display medium 1. However, the liquid crystal orienting apparatus is more simple in construction when the electrodes 78a and 78b are held stationary at fixed positions than when the electrodes 78a and 78b are movable because the electrodes 78a and 78b need to be connected to wiring lines.

When the electrodes 78a and 78b have flat contact surfaces, the electrodes 78a and 78b spaced from the liquid crystal display medium 1 are moved to positions corresponding to portions to be subjected to the action of the electrodes 78a and 78b on the liquid crystal display medium 1, and then the electrodes 78a and 78b are pressed against the liquid crystal display medium 1.

The liquid crystal of the PDLC film 4 can partially be oriented by forming projections in desired patterns in the contact surfaces of the electrodes 78a and 78b to come into contact with the surface extending over the PDLC film 4.

The liquid crystal orienting apparatus 7 of the present invention is able to orient the liquid crystal by using a reduced voltage when the same is provided with a heating means 75 for heating the PDLC film 4. The liquid crystal orienting apparatus 7 shown in FIG. 9 is provided with heat rollers as the heating means 75. In FIG. 9, the liquid crystal display medium 1 is heated by the heat rollers, i.e., the heating means 75, disposed on the opposite sides thereof, respectively, while the same is conveyed through a voltage applying section.

When the liquid crystal of the PDLC film 4 is a smectic liquid crystal that assumes a nematic phase when heated, the liquid crystal is oriented in a nematic phase by heating the same with the heating means 75. In this case, the liquid crystal can be oriented by using a driving electric field of a reduced intensity.

This liquid crystal orienting method and this liquid crystal orienting apparatus are capable of orienting the liquid crystal with reliability without damaging the entirely covered conductive layer 3 of the liquid crystal display medium and without damaging the entirely covered PDLC film 4 of the liquid crystal display medium 1 and of changing the display mode of the PDLC film 4 serving as a display part to erase or form an image.

There is no particular restriction on liquid crystal display mediums to be dealt with by the liquid crystal orienting method and the liquid crystal orienting apparatus of the present invention even if the liquid crystal display mediums are not provided with any layer corresponding to the conductive layer 3, provided that the liquid crystal display mediums meet a specific condition on volume resistivity. For example, liquid crystal display mediums provided with the protective layer 5 or those provided with a printed layer, which will be described later, can be dealt with by the liquid crystal orienting method and the liquid crystal orienting apparatus of the present invention.

The base 2 and the conductive layer 3 of the liquid crystal display medium, the liquid crystal and the polymer of the PDLC film 4, the material and the thickness of the protective layer 5, and the method of forming the protective layer 5 may be those disclosed in JP-A No. 5-301489 and Japanese Patent Application Nos. 6-33283, 6-44735 and 6-119702.

EXAMPLE

The present invention will more concretely be described in connection with an example thereof and a comparative example. In the following description, "parts" signifies "parts by weight", and "%" signifies "percent by weight" unless otherwise specified.

Example 1
Fabrication of Liquid Crystal Display Medium

An ITO film having a sheet resistivity of $10^2$ $\Omega$/sq as a conductive layer 3 was formed on a 188 $\mu$m thick transparent polyethylene terephthalate film from which a base 2 is formed. A 10 $\mu$m thick PDLC film 4 was formed over entire surface of the film by spreading a material in a film and drying the film. An ultraviolet setting resin (Seika Beam, Dainichi Seika Kogyo) was spread in a film over the entire surface of the PDLC film 4 and the film was hardened to form a 2 $\mu$m thick protective layer 5. Then, a 85 mm×54 mm cardlike liquid crystal display medium 1 was cut out from the thus fabricated structure by punching. A random orientation state of the liquid crystal was used as a displaying state, and a vertical orientation state of the same was used as an erasing state. A dichroic dye makes the display surface assume black in the displaying state and white in the erasing state.

The PDLC film was formed by spreading a microcapsulated dispersed coating liquid prepared by dispersing a liquid crystal (and a dichroic dye) by an in situ polymerizing method using an ultrasonic dispersion process. The principal components of the PDLC film are as follows.

Smectic liquid crystal: S-6, Merk Japan Co.
Dichroic dye: S-428, Mitsui Toatsu Kagaku K. K. (Black/transparent dichromatism)
Microcapsules: In situ polymerized methylmethacrylate
Protective colloid/polymer matrix: Polyvinyl alcohol KP-06, Nippon Gosei Kagaku Kogyo K. K.

Thickener/Matrix: Polyvinyl alcohol KH-20, Nippon Gosei Kagaku Kogyo K. K.

Liquid crystal/Matrix Ratio: 1/1

Liquid Crystal Orienting Apparatus

A liquid crystal orienting apparatus (erasing apparatus) as shown in FIG. 4 was constructed. Two roller electrodes 78a and 78b of a stainless steel having a diameter of 10 mm and a length of 50 mm were disposed at a center distance of 15 mm in parallel to each other so as to be able to be in contact with the liquid crystal display medium 1. Rubber rollers 73 of the same size as that of the roller electrodes 78a and 78b were disposed on the side opposite the side on which the roller electrodes 78a and 78b were disposed with respect to the liquid crystal display medium 1 to press the liquid crystal display medium 1 in firm contact with the roller electrodes 78a and 78b.

Writing Process

The PDLC film was heated by a thermal printer of 6 dot/mm in resolution and 0.4 mJ/dot in heating capacity to write information to the liquid crystal display medium.

The liquid crystal of the liquid crystal display medium 1 as fabricated is in a random orientation state, and the entire surface of the liquid crystal display medium 1 is black.

Liquid Crystal Orienting Process (Erasing Process)

The liquid crystal display medium 1 was subjected to an erasing process on the liquid crystal orienting apparatus 7. The two electrodes 78a and 78b were in contact with the surface, +300 V was applied to the electrode 78a and the electrode 78b was grounded (0 V) while the liquid crystal display medium 1 is being conveyed.

The conductive layer 3 served as a horizontal, transverse conductive path, the PDLC film changed from a black state to a transparent state, i.e., an erasing state.

Result of Evaluation

The ability of the liquid crystal display medium 1 to withstand repeated writing and erasing cycles, i.e., the rewriting withstand ability, was satisfactory, The liquid crystal display medium withstood 1000 or above rewriting cycles, which proved the excellent effect of the liquid crystal orienting method and the liquid crystal orienting apparatus of the present invention.

Although the thermal head was in contact with the liquid crystal display medium 1 in the writing process, and the electrodes 78a and 78b were in contact with the liquid crystal display medium 1, defects, such as flaws, were not made in the conductive layer 3 because the conductive layer 3 was protected by the PDLC film 4 and the protective layer 5, and the liquid crystal display medium 1 was brought into satisfactory contact with the electrodes 78a and 78b by the rubber rollers and, consequently, uniform, stable rewriting could be achieved.

As is apparent from the foregoing description, the liquid crystal orienting method and the liquid crystal orienting apparatus of the present invention do not require that the conductive layer 3 be exposed so that the electrodes 78a and 78b for electric field application are able to come into contact with the conductive layer 3, and are capable of orienting the liquid crystal even if the conductive layer 3 is covered with nonconductive or insulating layers, such as the PDLC film 4 and the protective layer 5. Consequently, the present invention solves problems resulting from the breakage of the conductive layer 3 that occurs when an electric field is applied by the conventional method to the liquid crystal display medium 1 with the conductive layer 3 exposed on the surface of the liquid crystal display medium grounded.

We claim:

1. A method of orienting a liquid crystal of a liquid crystal display medium having a base, a conductive layer formed on the base, and a reversible polymer dispersed liquid crystal film comprising a material prepared by dispersing the liquid crystal in a polymer, said method comprising the steps of:

disposing at least one pair of electrode means on the side of the liquid crystal display medium opposite to the base of the liquid crystal display medium; and changing a display state of the polymer dispersed liquid crystal film by orienting the liquid crystal contained in the polymer dispersed liquid crystal film by creating a potential difference between the pair of electrode means so that an electric field is formed between each one of the pair of electrode means and a part of the conductive layer corresponding to said each one of the pair of electrode means.

2. The method of orienting a liquid crystal of a liquid crystal display medium according to claim 1, wherein the pair of electrode means are a charger and a grounding electrode, and the display state of the polymer dispersed liquid crystal film is changed by orienting the liquid crystal contained in the polymer dispersed liquid crystal film by creating a potential difference between the charger and the grounding electrode.

3. The method of orienting a liquid crystal of a liquid crystal display medium according to claim 1, wherein the pair of electrode means are a pair of chargers, and the display state of the polymer dispersed liquid crystal film is changed by orienting the liquid crystal contained in the polymer dispersed liquid crystal film by creating a potential difference between the pair of chargers.

4. The method of orienting a liquid crystal of a liquid crystal display medium according to claim 1, wherein the pair of electrode means are a pair of electrodes, and the display state of the polymer dispersed liquid crystal film is changed by orienting the liquid crystal contained in the polymer dispersed liquid crystal film by creating a potential difference between the pair of electrodes.

5. The method of orienting a liquid crystal of a liquid crystal display medium according to claim 1, further comprising a step of heating the polymer dispersed liquid crystal film prior to creating a potential difference between the pair of electrode means.

6. The method of orienting a liquid crystal of a liquid crystal display medium according to claim 1, further comprising a step of removing charge on the polymer dispersed liquid crystal film after creating a potential difference between the pair of electrode means.

7. The method of orienting a liquid crystal of a liquid crystal display medium according to claim 1, wherein the liquid crystal display medium is moved relative to the pair of electrode means when creating a potential difference between the pair of electrode means.

8. The method of orienting a liquid crystal of a liquid crystal display medium according to claim 1, wherein the pair of electrode means are provided outside the liquid crystal display medium.

9. The method of orienting a liquid crystal of a liquid crystal display medium according to claim 1, wherein a nonconductive element is interposed between the polymer dispersed liquid crystal film and the pair of electrode means when creating a potential difference between the pair of electrodes.

10. The method of orienting a liquid crystal of a liquid crystal display medium according to claim 9, wherein the nonconductive element interposed between the polymer dispersed liquid crystal film and the pair of electrode means is a nonconductive film formed on the polymer dispersed liquid crystal film of the liquid crystal display medium.

11. An apparatus for orienting a liquid crystal of a liquid crystal display medium having a base, a conductive layer formed on the base, and a reversible polymer dispersed liquid crystal film comprising a material prepared by dispersing the liquid crystal in a polymer, said apparatus comprising:

a pair of electrode means disposed on the side of the liquid crystal display means opposite the base of the liquid crystal display medium; and a power supply unit for creating a potential difference between the pair of electrode means so that an electric field is formed between each of the pair of electrode means and a part of the conductive layer corresponding to said each one of the pair of electrode means.

12. The apparatus for orienting a liquid crystal of a liquid crystal display medium according to claim 11, wherein the pair of electrode means are a charger disposed so as not to come into contact with the liquid crystal display medium, and an electrode disposed so as to come into contact with the liquid crystal display medium.

13. The apparatus for orienting a liquid crystal of a liquid crystal display medium according to claim 12, wherein the electrode is grounded and the charger is connected to the power supply unit.

14. The apparatus for orienting a liquid crystal of a liquid crystal display medium according to claim 13, wherein the power supply unit is grounded.

15. The apparatus for orienting a liquid crystal of a liquid crystal display medium according to claim 12, wherein the electrode is a roller electrode.

16. The apparatus for orienting a liquid crystal of a liquid crystal display medium according to claim 11, wherein the pair of electrode means are a pair of electrodes disposed so as to come into contact with the liquid crystal display medium, and the power supply unit is connected across the pair of electrodes.

17. The apparatus for orienting a liquid crystal of a liquid crystal display medium according to claim 16, wherein the pair of electrodes are roller electrodes.

18. The apparatus for orienting a liquid crystal of a liquid crystal display medium according to claim 11, wherein the pair of electrode means are a pair of chargers disposed so as not to come into contact with the liquid crystal display medium, and the power supply unit is connected across the pair of chargers.

19. The apparatus for orienting a liquid crystal of a liquid crystal display medium according to claim 11, further comprising a heating means for heating the polymer dispersed liquid crystal film of the liquid crystal display medium.

20. The apparatus for orienting a liquid crystal of a liquid crystal display medium according to claim 11, further comprising a charge removing means for removing a charge on the polymer dispersed liquid crystal film of the liquid crystal display medium.

21. The apparatus for orienting a liquid crystal of a liquid crystal display medium according to claim 20, wherein the charge removing means is a grounding electrode disposed so as to come into contact with the liquid crystal display medium.

22. The apparatus for orienting a liquid crystal of a liquid crystal display medium according to claim 11, further comprising a conveying means for moving the liquid crystal display medium relative to the pair of electrode means.

23. The apparatus for orienting a liquid crystal of a liquid crystal display medium according to claim 11, wherein the pair of electrode means are disposed outside the liquid crystal display medium.

* * * * *